Sept. 17, 1968      U. L. LAMBERT      3,401,478
FISH GAFFING, GRAPPLING, AND LANDING APPARATUS
Filed Dec. 29, 1966      2 Sheets-Sheet 1
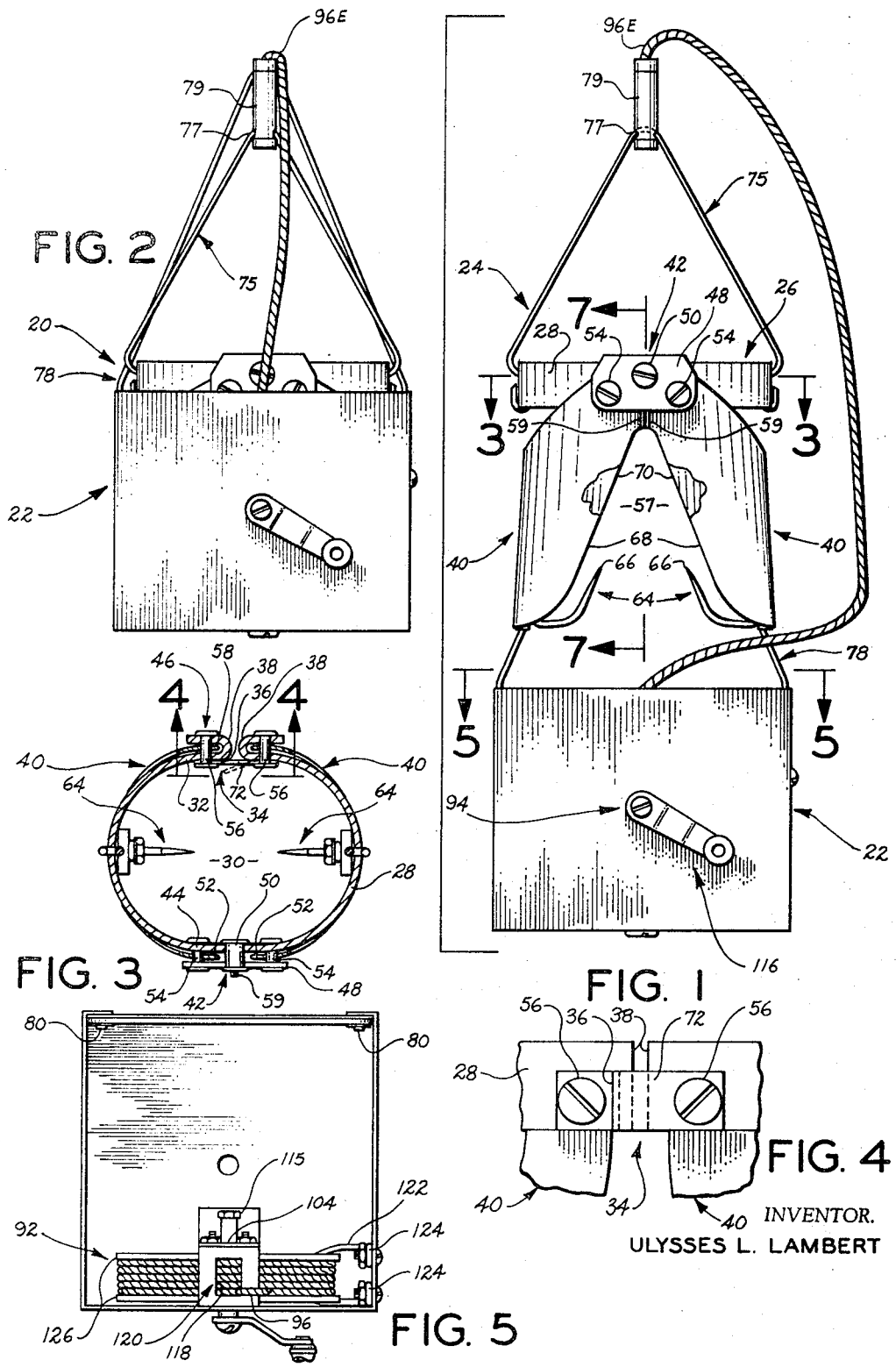
INVENTOR.
ULYSSES L. LAMBERT

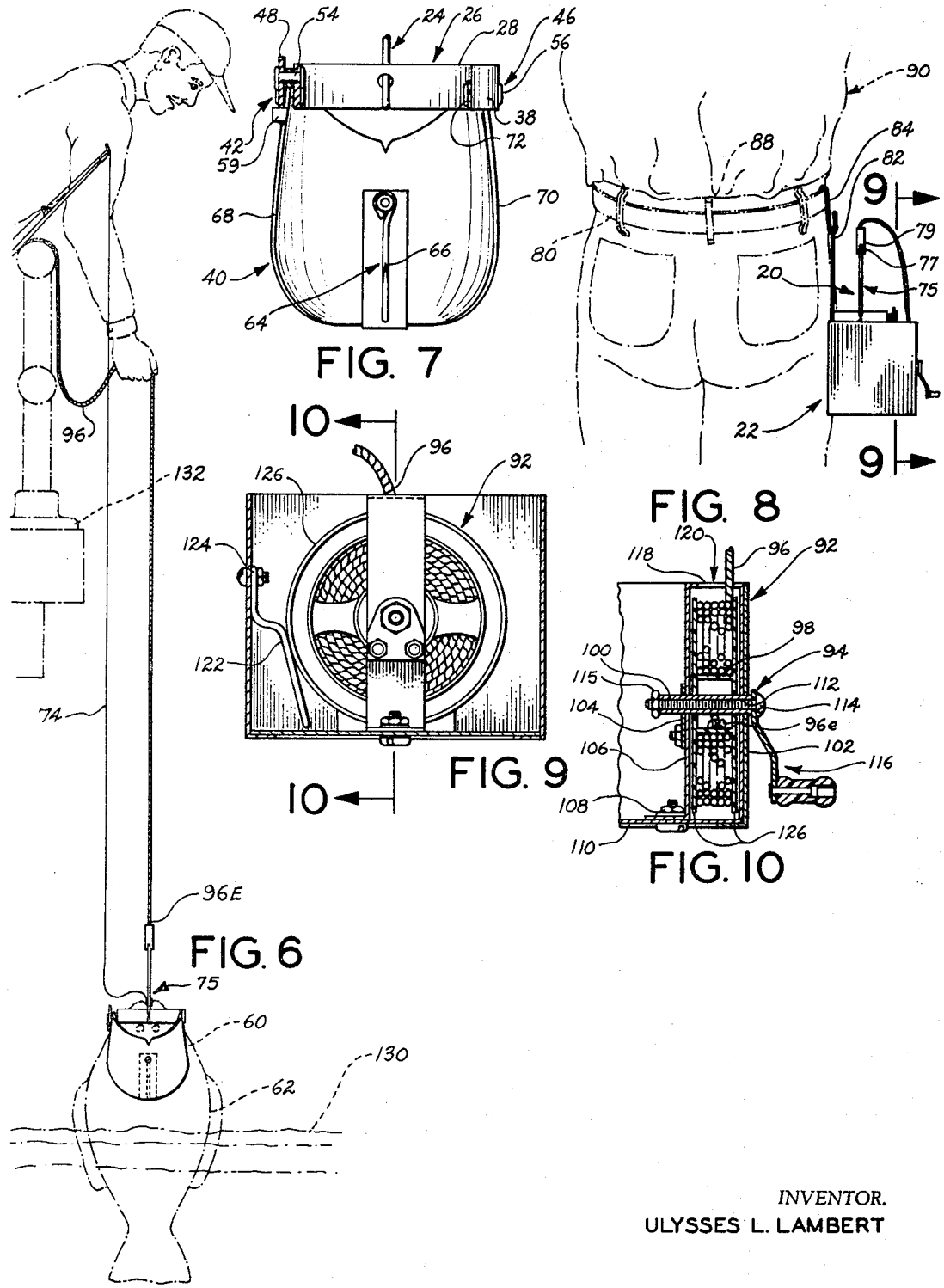

United States Patent Office 3,401,478
Patented Sept. 17, 1968

3,401,478
FISH GAFFING, GRAPPLING, AND
LANDING APPARATUS
Ulysses L. Lambert, 4258½ Normal Ave.,
Los Angeles, Calif. 90029
Continuation-in-part of application Ser. No. 494,664,
Oct. 11, 1965. This application Dec. 29, 1966, Ser.
No. 605,926
10 Claims. (Cl. 43—5)

ABSTRACT OF THE DISCLOSURE

A fish gaffing, grappling, and landing apparatus comprising a base in the form of a centrally open ring member having a fishing line entry slot passing through a portion thereof and provided with a pair of opposed arcuate, inwardly concave, pivotally mounted jaw members depending therefrom and having inwardly and upwardly directed penetrating hooks for grappling, gaffing, and holding a head portion of a fish. The jaw members are normally, when not in use, removably carried and stored within a container which is provided with a rotatably mounted cord supply spool which carries a desired length of cord having an inner end fastened thereto and having an outer free end extendable therefrom and fastenable to the upper apex portion of an upstanding bail handle which is fastened to the base.

---

This application is a continuation-in-part of my co-pending application, Ser. No. 494,664, filed Oct. 11, 1965, for a Fish Gaffing, Grappling, and Landing Device and relates to an improvement thereover.

Generally speaking, the present invention relates to the fishing equipment art and, more particularly, to a novel fish gaffing, grappling, and landing apparatus adapted to greatly facilitate the final phases of catching a large fish when using a conventional fishing pole and relatively lightweight fishing line.

I am aware of the fact that various fish landing devices have been invented and developed in the past in an attempt to solve the general problem referred to in the preceding paragraph. However, all of these devices known to me have certain disadvantages which are completely met and overcome in and through the use of the novel fish gaffing, grappling, and landing apparatus of the present invention.

For example, in prior art practice, fish are often gaffed, for landing purposes, with a very large hook carried at the end of a pole or rod and, in some cases, fish may be netted to facilitate landing them. However, both of these prior art practices require that one be able to get quite close to the fish at the end of the lightweight fishing line in order to accomplish the gaffing or netting operation. It is possible to do this when the fisherman is in a small boat and is, therefore, close to the surface of the water, but this is very difficult when the fisherman is fishing from a substantial height above the level of the water, such as when fishing from a pier or from the deck of a large boat, or in any manner which is relatively remote from the surface of the water. Under such circumstances, the fisherman normally attempts to play the fish and draw him in to a position very nearly underneath the location where the fisherman is standing on the pier, or adjacent to the side rail of a relatively large boat, and then the fisherman attempts to lift the fish out of the water and bring him up. It is during these last phases of a conventional fishing operation of the type just referred to that the lightweight fishing line (which shall also be construed throughout this application as also meaning the conventional short length of leader between the fishhook and the end of the fishing line) is likely to break and release the fish. This happens very often and is extremely exasperating to the fisheman who thus loses a fish which he has played, exhausted, and brought in, and then has lost at the last moment through breakage of the line during the attempted fish landing operation.

The novel fish gaffing, grappling, and landing apparatus of the present invention completely solves the above-mentioned prior art problem and completely meets and overcomes the above-mentioned disadvantages of prior art landing devices of the type referred to hereinbefore since the apparatus of the present invention may be used for gaffing, grappling, and landing of fish at very short range when the fisherman is close to the surface of the water and, when so used, the apparatus works substantially more effectively and efficiently than the hereinbefore-mentioned prior art fish landing devices. However, more importantly, the novel apparatus of the present invention can be used when the fisherman is remote from the surface of the water, such as when fishing from a high pier or high boat, or the like, under which circumstances the hereinbefore-mentioned prior art fish landing devices are very ineffectual and virtually useless. However, the novel fish landing apparatus of the present invention works just as well at such heights as it does close to the surface of the water and provides a positive means for landing the fish without breaking the conventional lightweight fishing line.

Additionally, the novel fish-landing apparatus of the present invention includes as a part thereof container means normally adapted to removably carry the pair of jaw members, and upper ring member pivotally mounting said jaw members of the apparatus, within said container means in a manner effectively storing and immobilizing said jaw members and with said container means being provided with mounting means adapted for removable attachment with respect to a torso-encircling belt, so that the entire apparatus can be removably mounted at a selected position laterally adjacent to a fisherman's torso at a conveniently accessible location which is unobtrusive and which, in no way, interferes with the fisherman's performance of normal fishing operations through the use of a fishing pole, fishing line, and fish hook at the end thereof operated in a conventional manner. In other words, the improved apparatus of the present invention can be carried in the manner just described until it is needed and until such time will be completely out of the way and, additionally, the penetrating hooks carried by the inner sides of the jaw members will be so protected that it will be impossible for anyone to be inadvertently injured thereby.

Also, the improved form of the invention differs from the form of the invention set forth in the hereinbefore-identified parent application in that, in the present improved form of the invention, a cord supply spool means is carried by said container means and mounts a desired length of cord having an inner end fastened thereto and having an outer free end extending therefrom to its attachment point to an upper apex connection portion of a handle means carried by the ring member, comprising the base means pivotally carrying the jaw members of the apparatus of the present invention. In other words, the cord supply spool means remains mounted on the container means and merely supplies cord as needed to the gaffing structure which is adapted to be moved downwardly along a fishing line into gaffing engagement with a forward or head portion of the body of a fish which has been initially caught by a conventional fishing line and hook. This provides a simpler construction for the gaffing structure than in the previously identified parent patent application and has other individual advantages also.

With the above points in mind, it is an object of the present invention to provide an improved fish gaffing, grappling, and landing apparatus of the character referred to herein having any or all of the advantages referred to herein and including any or all of the features referred to herein, generically and/or specifically, and individually or in combination, and which is of extremely simple, inexpensive constructon adapted for ready mass manufacture at relatively low cost whereby to be conducive to widespread use thereof.

It is a further object of the present invention to provide a fish landing apparatus of the character referred to herein wherein projecting hook means, comprising fish-engaging portions thereof, are normally inwardly directed and substantially completely enclosed by the remainder of the apparatus, thus virtually eliminating the possibility of accidental injury occurring to a user of the device or any person accidentally coming into contact with the device when it is not being used.

It is a further object of the present invention to provide a novel fish landing apparatus of the character referred to herein, which can normally rest upon the bottom of the previously mentioned container means carried by the fisherman's belt adjacent to his rear hip pocket, or at any other convenient location while he is fishing in the normal way and need not, at that time, be engaged with the conventional lightweight fishing line, but which, after a fish has been played and drawn into a position below the fisherman in the water and appropriate for performance of a fish landing operation, can then be quickly slipped over the conventional lightweight fishing line into engaged relationship thereon and can be controllably slidably lowered down and along the conventional lightweight fishing line until it positively engaged the head end or forward end of the fish at the end of the conventional lightweight fishing line in a very effective manner, after which the landing device can be lifted from the water, which will of course, lift the fish from the water also, and this will remove all tension from the conventional lightweight fishing line during the landing operation.

It is a further object of the present invention to provide a novel fish landing apparatus of the character referred to herein which, when engaged on the upper end of a fishing line in the manner referred to in the preceding object, can be slidably lowered along the line, in the manner referred to in the preceding object, toward a fish, and which, in so doing, can freely pass obstructions along the length of the fishing line, such as a conventional bobber, sinker, or the like, without in any way interfering with same and without becoming hung up thereon in a manner which would prevent the further lowering of the novel fish-landing device of the present invention.

It is a further object of the present invention to provide novel fish-landing apparatus of the character referred to herein, wherein each of the opposed, pivotally mounted jaw members has front and rear lower edge portions which are downwardly divergingly cut away and effectively outwardly inclined with respect to each other when said jaw members are in a jaw-closed relationship whereby to allow a head portion (or head and forward body portion) of a fish of the so-called flat-fish type to extend outwardly between said diverging front and rear lower edge portions of said opposed jaw members, even when they are substantially in said jaw-closed relationship or are in any position between said jaw-closed relationship and a jaw-opened relationship, as normally determined by the size of the fish head engaged therebetween.

Further objects are implicit in the detailed description which follows hereinafter (which is to be considered as exemplary of, but not specifically limiting, the present invention), and said objects will be apparent to persons skilled in the art after a careful study of the detailed description which follows hereinafter.

For the purpose of clarifying the nature of the present invention, one exemplary embodiment of the invention is illustrated in the hereinbelow-described figures of the accompanying single drawing sheet and is described in detail hereinafter.

FIG. 1 is a greatly-reduced-size exploded elevational view illustrating one exemplary form of the novel fish gaffing, grappling, and landing apparatus of the present invention, with the gaffing structure thereof shown in vertically exploded and removed relationship with respect to the container means portion of the complete apparatus which normally contains and carries the gaffing structure in a manner such as is shown in FIG. 2. This view also shows the free end of the cord in partially extended form.

FIG. 2 is a view similar to FIG. 1, but shows the complete apparatus in its normal fully assembled relationship suitable for ready storage and/or transport.

FIG. 3 is a sectional view taken substantially along the plane and in the direction indicated by the arrows 3—3 of FIG. 1 with the container means removed from its position below the removable gaffing structure for reasons of drawing simplification and clarity. This view shows the opposed jaw members in their normal jaw-closed relationship and shows the resilient tab defining the entry slot means in its normal closed relationship in solid lines and in its temporarily forcibly inwardly resiliently deflected relationship in broken lines—this latter temporarily open relationship being adapted to allow the entry of a conventional fishing line therethrough into an interior position between the opposed closed jaw members when the gaffing structure is to be put into use for gaffing purposes in a manner such as is illustrated in FIG. 6.

FIG. 4 is an enlarged fragmentary view taken substantially along the plane, and in the direction, indicated by the arrows 4—4 of FIG. 3, and illustrates the resilient closure tab of the entry slot defining means drawn to an enlarged scale as compared to the showing of FIG. 3.

FIG. 5 is a top plan view taken substantially along the plane and in the direction indicated by the arrows 5—5 of FIG. 1 and clearly illustrates in top plan view one form of the container means (with the removable gaffing structure temporarily removed therefrom) and also clearly shows the cord supply spool means mounted on one upstanding wall of said container means. It should be noted that the bail handle means carried by one wall of the container means is shown in full top plan view rather than in cross-section.

FIG. 6 is a greatly-reduced-size view illustrating one exemplary form of the novel fish gaffing, grappling, and landing apparatus of the present invention in actual use and shows it after it has been engaged with a conventional lightweight fishing line and has been allowed to slide downwardly along the length thereof toward the fish-hook end thereof and a fish which has been previously hooked thereon, so that the novel gaffing structure of the present invention becomes positively and firmly engaged with respect to the head (or forward head end portion) of the hooked fish, after which the apparatus of the present invention is operated in the manner illustrated in FIG. 6 for lifting the fish out of the water and up to the pier where the fisherman is located, in a manner which removes all tension from a conventional lightweight fishing line and prevents any likelihood of its being accidentally broken during the fish-landing operation or prevents any likelihood of the fish hook being torn out of its hooked location within the fish's mouth, as is characteristic of certain fish. It should be noted that in the example illustrated in FIG. 6 the fish shown in phantom is of the so-called flat-fish type which has a very broad, flat body starting immediately from the head end of the fish and expanding in width along the length thereof to about the center thereof and then contracting in width toward the tail end thereof—the overall width being very much greater than is the case with other conventional fish of approximately the same weight. For example, a halibut, a sole, or the like, has the general appearance of the fish shown in phantom in FIG. 6 and it should be noted that the opposed jaw members have cut-away portions at the sides, as best shown in FIG. 1, which allow such a very wide flat fish to be positively engaged by the opposed jaw members while extending partially outwardly through said angularly cut-away side portions of the opposed jaw members, as is clearly shown in FIG. 6.

FIG. 7 is a sectional view taken substantially along the plane and in the direction indicated by the arrows 7—7 of FIG. 1.

FIG. 8 is an additional reduced-size view showing the fully assembled apparatus in its non-use transport relationship similar to that shown in FIG. 2 but with the entire apparatus mounted on a belt hook carried by a belt encircling the torso of a fisherman (shown fragmentarily in phantom) so that the apparatus is out of the way and does not interfere with normal fishing operations and yet is readily accessible when needed for use in landing a fish which has been caught by the conventional fishing apparatus.

FIG. 9 is a larger scale sectional view taken substantially along the plane and in the direction indicated by the arrows 9—9 of FIG. 8 and most clearly illustrates the cord supply spool means and the top-positioned cord outlet guide means of the exemplary form of the invention illustrated.

FIG. 10 is a cross-sectional and partly-broken-away view taken substantially along the plane and in the direction indicated by the arrows 10—10 of FIG. 9.

Generally speaking, the exemplary form of the invention illustrated may be said to comprise a fish gaffing, grappling, and landing apparatus, such as is generally designated by the reference numeral 20. Said fish-landing apparatus 20 may be said to comprise a container means, one exemplary form of which is generally designated by the reference numeral 22, and a removable gaffing structure or means, one exemplary form of which is generally designated by the reference numeral 24 and which is normally adapted to be carried by and largely within the container means 22 when the complete apparatus is in a storage or transport relationship such as is best shown in FIGS. 2 and 8.

The removable gaffing structure means 24 will first be described and may be said to comprise a base means, such as is generally designated at 26, and which, in the exemplary form illustrated, takes the form of a centrally open ring member 28, which is of slightly oval configuration as seen in top plan view, although not specifically so limited in all forms of the invention. Said ring member 28 defines a central opening 30 through which the forward or head portion of a fish which is to be landed is normally adapted to extend upwardly. It should be noted that one portion 32 of the ring member 28 has entry slot means, such as is generally designated by the reference numeral 34, which effectively defines an entry slot at the location indicated by the reference numeral 36, which, in the exemplary form of the invention indicated, is normally closed but can be forcibly deflected from the closed solid-line position shown in FIG. 3 into the open broken-line position shown in FIG. 3 and which is effectively positioned inwardly of an opening between the opposed centrally-positioned upper edge portions or lips 38 of the two corresponding jaw members, each generally designated by the reference numeral 40, which will be described in greater detail hereinafter. The detailed structure of said entry slot means or entry slot defining means indicated generally at 34 will be described more particularly hereinafter.

The ring member 28 of the base means 26 is provided with, and controllably pivotally mounts, in opposed relationship, the previously mentioned pair of jaw members 40, each of which is of arcuate configuration as seen in top plan view in FIG. 3 below the ring member 28, which is shown in section along the plane 3—3 of FIG. 1. Said ring member 28 pivotally mounts said jaw members 40 by pivotal mounting means, such as is generally designated at 42 at the one side 44 of the ring member 28 and such as is generally designated at 46 at the other side 32 of the ring member 28. Said mounting means 42 comprises a vertically directed, thin-sheet panel member 48 fastened by a suitable rivet 50, or the like, which is headed at each end and which fixedly mounts said panel member 48 outwardly of the portion 44 of the ring member 28 in a manner providing a sufficient space between said portion 44 of the ring member 28 and said mounting panel member 48 to allow the positioning therebetween of a pair of ears 52 carried by the corresponding sides of each of the two jaw members 40, with said ears 52 being apertured and being pivotally and rotatively mounted on the pair of laterally positioned headed rivets 54 which extend from the mounting panel member 48 to the portion 44 of the ring member 28, as is perhaps best shown in FIG. 3. Two similar rivets 56 extend through the folded-back end portions of the opposite side 32 of the ring member 28 immediately adjacent to the opposed lip or edge portions 38 whereby to effectively pivotally mount similar ears 58 carried by the opposite sides of said two jaw members 40, as is perhaps best shown in FIG. 3.

Said outer rivets 54 and said rivets 56 effectively comprise pivot pins which act to pivotally mount each of said jaw members 40 in a manner such that they normally depend below the level of the ring member 28 and are normally in what might be called a jaw-closed relationship, such as is clearly shown in FIGS. 2 and 3, wherein said previously mentioned lips or opposed upper jaw edge portions 38 and similar lips or upper edge portions on the opposite sides of the jaw members are designated by the reference numerals 58, and the lips of each of said pairs thereof abut each other and, thus, cause the two arcuate jaw members 40 to effectively define a downwardly directed (and, in some cases, slightly oval as seen in top plan view) opening 59 adapted to receive upwardly therethrough, either substantially fully therewithin or at least partially centrally therewithin, the head end or forward end 60 of a fish 62 which has been previously caught and has a conventional hook within its mouth and is positioned at the end of a conventional lightweight fishing line which extends downwardly through the previously mentioned upper opening 30 and the lower opening 59 just referred to.

Each of the jaw members 40 is provided on the inner side thereof with inwardly and, to a degree, upwardly directed penetrating hook means, such as the two hook means generally designated at 64, each of which is so carried by the corresponding pivotally mounted jaw member 40 as to allow a fish's head end or forward end portion 60 to move upwardly through the lower opening 59 between the jaw members 40 whereby to effectively pass the hook means 64, but to prevent the head 60 of the fish 62 from being removed from said inserted position between the jaw members 40. Whenever this action tends to occur, the points 66 of the hooks or hook means 64 become engaged with the fish head 60 and tend to be drawn thereinto and the jaw members 40 tend to be drawn toward closed relationship again with the fish head 60 positively locked therebetween (either substantially fully when the fish head is of a conventional narrow type or partially when the fish is of a so-called flat-fish type, as is shown in FIG. 6), and said fish head 60 is firmly and positively locked in said relationship by reason of the hooks or hook means 64 which have penetrated thereinto.

The gaffing of a flat fish as referred to above and as illustrated in FIG. 6 is facilitated by reason of the fact that the jaw members 40 have lower edge portions 68 and 70 which are similarly downwardly divergingly angularly cut away and outwardly inclined with respect to each other when said jaw members 40 are in the jaw-closed relationship most clearly shown in FIG. 1, which thus allows the head portion 60 of the flat fish 62 to extend outwardly between said diverging lower edge portions 68 and 70 of said jaw members 40, even if said jaw members are very nearly or substantially fully closed.

The entry slot means 34 in the exemplary form of the invention illustrated, comprises a laterally directed, resilient closure tab member 72 fastened at opposite ends thereof to the inner surfaces of the ring member 28 by the rivets 56, as is clearly shown in FIGS. 3 and 4. Said resilient closure tab member has a normally closed slot 36 therethrough and is made of a material such as plastic or other relatively compliant material adapted to be easily temporarily forcibly deflected (in the example illustrated, inwardly) into an open relationship such as is shown in broken lines in FIG. 3 whereby to very substantially enlarge or open the entry slot 36 so as to allow the inward passage therethrough (or the outward passage therethrough) of a fishing line (not shown since such is well known in the art) from a position exterior of said ring member 28 to a position interior thereof and vice versa. This, of course, allows the device to be slipped into operative relationship relative to a fishing line, such as is shown at 74 in FIG. 6 so that it lies within the ring member 28 and between the jaw members 40 so that the entire gaffing structure 24 can then be slidably moved down the fishing line into gaffing position as shown in FIG. 6.

The ring member 28 of the base means 26 is provided substantially at the centers of opposed side edge portions thereof with upstanding bail handle means indicated generally at 75 terminating in an uppermost apex cord attachment portion 77 which pivotally mounts a length of tubing 79 to which the free outer end 96E of a cord 96 is attached.

The previously mentioned container means 22 takes the form of a container box which is of substantially rectangular shape as seen in any orthographic view and which, therefore, substantially defines a parallellopiped which has an open top as indicated at 76. Said container box means 22 is of a size such as to just be adapted to snugly receive therewithin the opposed jaw members 40 when they are in the jaw-closed relationship shown in FIG. 1, thus, effectively holding them in said closed relationship when they are received within the container box means 22 in a relationship such as is most clearly shown in FIGS. 2 and 8. This maintains said jaw members 40 in an easily transportable or storable manner and in a manner such that the opposed hook members 64 are virtually completely prevented from any possibility of injuring a person accidentally or inadvertently.

The container box means 22 is provided an upwardly extending bail handle means 78 attached as indicated at 80 with respect to one side of the container means 22 and having an uppermost connection apex connection portion 82 which is adapted to be provided with a belt hook means 84 or other functional equivalent for effectively connecting same with respect to a torso-encircling belt 86 which is normally worn around the waist 88 of a fisherman, such as is generally fragmentarily indicated in phantom at 90 in FIG. 8, whereby to make it possible to mount the entire apparatus at a selected location laterally adjacent to the fisherman's torso or waist and at a conveniently accessible location which will in no way interfere with conventional fishing operations. For a right-handed fisherman, this is usually a position adjacent to his right rear pocket, although the apparatus may be mounted at any convenient location and may be supported in a variety of ways, all within the broad scope of the present invention.

The container means 22 is provided with cord supply spool means, such as is generally designated by the reference numeral 92 and mounting means therefor, such as is generally designated by the reference numeral 94, which rotatively mounts the cord supply spool means 92 with respect to the container means 22 in a position such as to not in any way interfere with the storage of the gaffing structure 24 within the container means 22 and such as to not in any way interfere with the free removal and replacement of said gaffing structure 24 with respect to the container means 22 and yet be available for convenient operation as needed in either supplying or retrieving the free end 96E of the length of cord 96 adapted to be normally carried in wound relationship by said cord supply spool means 92.

Said outer end 96E of the cord 96 is adapted to be connected to the first-mentioned bail handle means 75 of the gaffing structure 24 as previously mentioned, and the inner end 96e of said cord 96 is adapted to be connected to a central hub portion 98 of the spool means 92 so that the cord 96 may be effectively retracted or extended with respect thereto. The spool means 92 is rotatably mounted on a sleeve or spindle member 100 carried between the wall portion 102 of the container means 22 and a corresponding bracket member 104 mounted on an upstanding support member 106 fastened by fastening means 108 to the bottom wall 110 of the container means 22, as is best shown in FIG. 10. It should be noted that the inner hub 98 engages and rotates with the spindle 100 and that the outer end of the sleeve or spindle 100 has a bore 112 adapted to receive a threaded screw 114 fastened to the inner nut 115 for the purpose of removably attaching an operating crank and crank handle means 116 thereto in a position exterior of the wall portion 102 of the container means 22 in a conveniently manually accessible and graspable use position, making it possible to operate same in a cord rewinding manner after completion of a gaffing operation such as is illustrated in FIG. 6.

The previously mentioned upstanding support member 106 extends to a position above spool means 92 and across the top thereof where it is provided with an aperture 118 and thus may effectively be termed a top-positioned cord outlet guide means, which is generally designated by the reference numeral 120, through which the cord 96 is adapted to pass prior to having its free end 96E fastened to the connection apex 77 of the first-mentioned bail handle means 75 carried by opposite side portions of the previously mentioned ring member 28.

The cord supply spool means 92 is provided with cord-retaining keeper means 122 comprising a curved loop of wire fastened by the fastening means 124 in a position such as to lie adjacent to the rim portions 126 of the spool means 92 and to thus prevent the lateral escape of the cord 96 from said spool rims 126 and from said keeper wire 122 during reeling and unreeling operation of said cord supply spool means 92.

It should be noted that the crank handle 116 may in some forms of the invention, if desired, be removed to facilitate ready storage and transport of the apparatus. This is especially true when the apparatus is to be packed for shipment, although the invention is not specifically so limited.

In operation, a person first catches a fish on a conventional lightweight fishing line such as is shown at 74 in FIG. 6 and, as soon as the fish 62 has been drawn in as close to the fisherman 128 as possible (usually below the fisherman and near the surface of the underlying water 130), the fisherman manually removes the entire gaffing structure 24 from the container means 22 carried on his hip, holding said gaffing structure 24 by the bail handle 75, and then slips said gaffing structure laterally over the fishing line 74 by way of the entry slot means 34 until the fishing line 74 lies on a position extending vertically downwardly through the upper opening 30 and lower opening 59. Then the fisherman grasps the portion of the cord 96 between the cord outlet guide means 120 and the cord's free end 96E fastened to the apex portion 77 of the bail handle means 75 and allows the entire gaffing structure 24 to slide downwardly along the fishing line 74 until it reaches the head 60 of the fish 62 and slides downwardly thereover, followed by the application of upward tension to the cord 96 so as to cause positive locking engagement of the hooks 64 with respect to the fish head 60. Then the portion of the cord 96 above the free end 96E thereof is used to manually lift the entire gaffing structure 24 and the fish 62 out of the water 130 and directly upwardly therefrom to the surface of the pier 132 where the fisherman 128 is standing or sitting. This takes all of the tension off of the conventional lightweight fishing line 74 during the fish-landing operation and prevents it from being inadvertently broken and also prevents accidental disengagement of a fish hook at the end of said fishing line 74 (said fish hook not being shown) from the mouth of the fish 62, which frequently happens if the fishing line and fish hook are used in an attempt to directly land the fish without auxiliary landing apparatus.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. Fish gaffing, grappling, and landing apparatus, comprising: a base means taking the form of a centrally open ring member having a fishing line entry slot means effectively passing through a portion of said ring member; said base means being provided with upstanding handle means terminating in an uppermost apex cord-attachment portion; said base means being provided with and controllably pivotally mounting a pair of opposed, arcuate, inwardly concave jaw members for oppositely directed, outward, separating jaw-opening pivotal movement away from each other toward an outer extreme jaw-open relationship and for oppositely directed inward jaw-closing pivotal movement toward each other and toward an inner extreme jaw-closed relationship; and container means normally removably carrying said pair of jaw members in said jaw-closed relationship and carrying said base means in a manner effectively storing and immobilizing said jaw members until manually removed from said container means for use in gaffing, grappling, and holding a head portion of a fish; said container means being provided with cord supply spool means and mounting means rotatively mounting same, said cord supply spool means being provided with and normally carrying therearound a desired length of cord having an inner end effectively fastened with respect thereto and having an outer free end extendable therefrom and fastened to said upper apex cord-attachment portion of said upstanding handle means; said pair of opposed jaw members being provided inwardly thereof with inwardly directed penetrating hook means for gaffing, grappling, and holding a head portion of a fish which has been caught on a fishhook carried at a forward end of a fishing line.

2. Fish gaffing, grappling, and landing apparatus as defined in claim 1, wherein said cord supply spool mounting means is provided with a top-positioned cord outlet guide means through which the free end of the cord passes upwardly for connection to said uppermost apex cord-attachment portion of said upstanding handle means.

3. Fish gaffing, grappling, and landing apparatus as defined in claim 1, wherein said cord supply spool means is effectively provided with operating crank handle means normally extending to a position exterior of said container means in a conveniently manually accessible and graspable cranking-use position.

4. Fish gaffing, grappling, and landing apparatus as defined in claim 1, wherein said container means comprises an upwardly open box having a bottom wall and upstanding side wall means defining a hollow interior chamber therewithin, said cord supply spool means being provided with an operating crank handle means removably attached thereto through a portion of said upstanding side wall means of said container means and having a portion normally positioned exteriorly of said side wall means of said container means in a conveniently accessible and graspable cranking-use position.

5. Fish gaffing, grappling, and landing apparatus as defined in claim 1, wherein said container means comprises an upwardly open box having a bottom wall and upstanding side wall means defining a hollow interior chamber therewithin, said cord supply spool means being provided with an operating crank handle means removably attached thereto through a portion of said upstanding side wall means of said container means and having a portion normally positioned exteriorly of said side wall means of said container means in a conveniently accessible and graspable cranking-use position, but being manually removable from said exterior position for convenient storage within said container means when the apparatus is in a non-use, transport, and storage relationship.

6. Fish gaffing, grappling, and landing apparatus as defined in claim 1, where said fishing line entry slot means comprises a laterally-directed, resilient closure tab member for said entry slot adapted to be temporarily forcibly deflected into an open relationship defining an open entry slot for the passing therethrough of a fishing line from a position exterior of said base means into a position interior thereof and vice versa.

7. Fish gaffing, grappling, and landing apparatus as defined in claim 1, wherein each of said jaw members has front and rear upper edge portions adapted to be positioned immediately adjacent to each other when said jaw members are pivoted into jaw-closed relationship and each of said jaw members has front and rear lower edge portions which are downwardly divergingly angularly cut away and outwardly inclined with respect to each other when said jaw members are in the jaw-closed relationship to allow a head portion of a fish of the flat-fish type to extend outwardly between said diverging front and rear lower edge portions of said jaw members, even when said jaw members are substantially in said jaw-closed relationship.

8. Fish gaffing, grappling, and landing apparatus as defined in claim 1, wherein a cord-retaining keeper means is positioned adjacent to said cord supply spool means in a manner to prevent the lateral escape of the cord from said cord supply spool means during reeling and unreeling operation of said cord supply spool means.

9. Fish gaffing, grappling, and landing apparatus as defined in claim 1, wherein said container means is provided with upwardly extending handle means having a connection portion provided with attachment means for effectively connecting same with respect to a fisherman's body at a convenient location.

10. Fish gaffing, grappling, and landing apparatus as defined in claim 1, wherein said container means is provided with upwardly extending handle means having an uppermost apex connection portion provided with attachment belt hook means for effectively controllably and removably connecting same with respect to a torso-encircling belt whereby to make it possible to mount said container means at a selected position laterally adjacent to a fisherman's torso at a conveniently accessible, unobtrusive, and non-interfering location.

References Cited

UNITED STATES PATENTS

| | | | |
|---|---|---|---|
| 2,235,371 | 3/1941 | Jyrkas | 43—5 |
| 2,586,170 | 2/1952 | Lawrenz | 43—17.2 |
| 2,641,078 | 6/1953 | Gearien | 43—5 |
| 2,895,250 | 7/1959 | Burden | 43—17.2 |
| 3,267,603 | 8/1966 | Josephs et al. | 43—5 |

WARNER H. CAMP, *Primary Examiner.*